United States Patent [19]

Matsuzawa et al.

[11] 3,917,825

[45] Nov. 4, 1975

[54] PREPARATION FOR RECTAL OR VAGINAL ADMINISTRATION CONTAINING LH-RH OR ITS ANALOGS

[75] Inventors: Tai Matsuzawa, Osaka; Shin-ichiro Hirai, Kyoto; Masahiko Fujino, Hyogo; Shigeru Kobayashi, Osaka; Iwao Yamazaki, Hyogo, all of Japan

[73] Assignee: Takeda Chemical Industries, Ltd., Japan

[22] Filed: Oct. 12, 1973

[21] Appl. No.: 406,174

[30] Foreign Application Priority Data

Oct. 12, 1972 Japan............................. 47-102500

[52] U.S. Cl. ................................................ 424/177
[51] Int. Cl.$^2$........................................ A61K 37/00
[58] Field of Search................... 260/112.5; 424/177

[56] References Cited
OTHER PUBLICATIONS

Fujino et al.: Biochem. Biophys. Res. Comm., 49, 863–869 (1972).

Fujino et al.: Biochem. Biophys. Res. Comm., 49, 698–705 (1972).

Sollmann, T., "Manual of Pharmacology", 8th ed., W. B. Saunders Co., Philadelphia, 1957, pp. 9–13, 24, 25, 30, 31.

Amoss et al.: J. Clin. Endocrinol. Metab., 35, 175–177 (1972).

Primary Examiner—Lewis Gotts
Assistant Examiner—Reginald J. Suyat
Attorney, Agent, or Firm—Wenderoth, Lind & Ponack

[57] ABSTRACT

Novel preparations essentially comprising nona- or deca-peptide having luteinizing hormone-releasing activity dispersed homogeneously in an oleaginous base or in a mixture of the oleaginous base and a non-ionic surfactant effectively exhibit a luteinizing hormone-releasing activity when administered to warm-blooded animals by rectal or vaginal route.

12 Claims, No Drawings

PREPARATION FOR RECTAL OR VAGINAL ADMINISTRATION CONTAINING LH-RH OR ITS ANALOGS

This invention relates to novel preparations containing, as the main pharmaceutically active ingredient, nona- or deca-peptide having luteinizing hormone-releasing activity (hereinafter abbreviated as LH-releasing activity).

Luteinizing hormone-releasing hormones (hereinafter abbreviated as "LH-RH"), which is also known as gonadotropin releasing hormone (GnRH), has been clinically applied to warm-blooded animals including human beings for causing, among others, the promotion of ovulation. The administration of LH-RH has, however, been limited only to injections and no other route of administration has been effectively put into clinical use, because LH-RH is known to be readily decomposed by proteolytic enzymes such as trypsin and chymotrypsin.

There has been a desideratum for more convenient route of administration of LH-RH other than injections, but it has not been satisfied yet.

In view of the state of the art concerned, the present inventors have made an extensive study for searching such preparations as can be administered with sufficient clinical effects by more preferable route of administration.

They found that when a preparation consisting of LH-RH dispersed in an oleaginous base or in a mixture of the oleaginous base and a non-ionic surfactant is administered by rectal or vaginal route, LH-RH is absorbed to the degree that LH-RH produces sufficiently its pharmacological activity without causing any undesirable side effect.

The first object of this invention is to provide novel preparations essentially consisting of a nona- or deca-peptide having LH-releasing activity as the main pharmacologically active ingredient disperesed homogeneously in an oleaginous base or in a mixture of the oleaginous base and a non-ionic surfactant.

The second object of this invention is to provide a process for producing the present preparations.

A typical example of the decapeptide to be employable in the present invention is LH-RH of the formula:

(Pyr)Glu-His-Trp-Ser-Tyr-Gly-Leu-Arg-Pro-Gly-NH$_2$

It should be understood that, throughout the present specification and the claims, peptides and amino acids are shown by conventional abbreviations commonly used in the chemistry of peptides.

Namely, (Pyr)Glu, His, Trp, Ser, Tyr, Phe, Gly, Leu, ILe, NLe, Val, NVal, Met, Arg and Pro represent "residues" of L-pyroglutamic acid, L-histidine, L-tryptophane, L-serine, L-tyrosine, L-phenylalanine, glycine, L-leucine, L-isoleucine, L-norleucine, L-valine, L-norvaline, L-methionine, L-arginine and L-proline, respectively. By the "residue" is meant a radical derived from the corresponding α-amino acid by eliminating the OH portion of the carboxyl group and the H portion of the α-amino group. Thus in the case of L-arginine

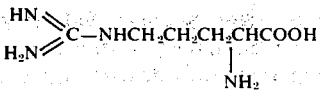

for example, which may be represented by the formula NH$_2$—A—COOH (NH$_2$ is the α-amino radical), the radical(—NH—A—CO—) represents a residue of L-arginine and is abbreviated as "—Arg—". Abbreviations for the other α-amino acids mentioned above have the similar meaning as the illustration just given for L-arginine.

Examples of the nona-peptides to be employable in the present invention are shown by general formula:

(Pyr)Glu-His-Trp-Ser-A$_1$-Gly-A$_2$-Arg-Pro-Y (I)

(wherein A$_1$ means Tyr or Phe; A$_2$ means Leu, ILe, NLe, Val, NVal, Met or Phe; Y means NHR in which R means an alkyl group of 1 to 3 carbon atoms which may be substituted with a hydroxyl group or alternatively Y means pyrrolidino group). Examples of specific peptides are enumerated below:

(Pyr)Glu-His-Trp-Ser-Tyr-Gly-Leu-Arg-Pro-NHC$_2$H$_5$
(Pyr)Glu-His-Trp-Ser-Tyr-Gly-Leu-Arg-Pro-NHCH$_2$CH$_2$OH
(Pyr)Glu-His-Trp-Ser-Tyr-Gly-Leu-Arg-Pro-NHCH$_3$
(Pyr)Glu-His-Trp-Ser-Tyr-Gly-Leu-Arg-Pro-Pyrrolidine
(Pyr)Glu-His-Trp-Ser-Tyr-Gly-NLe-Arg-Pro-NHC$_2$H$_5$
(Pyr)Glu-His-Trp-Ser-Phe-Gly-Leu-Arg-Pro-NHC$_2$H$_5$
(Pyr)Glu-His-Trp-Ser-Phe-Gly-ILE-Arg-Pro-NHC$_2$H$_5$
(Pyr)Glu-His-Trp-Ser-Tyr-Gly-Met-Arg-Pro-NHC$_2$H$_5$ The oleaginous base employable in this invention includes any bases which are known to be usable in the manufacture of ointments, suppositories, etc. Such an oleaginous base is enumerated by, for example, sesame oil, olive oil, soybean oil, rapeseed oil, cottonseed oil, linseed oil (from *Lini Semen*), castor oil, rice bran oil, tsubaki oil (from *Camellia japonica L.*), corn oil, peanut oil, coconut oil, poppy seed oil, almond oil, avocado oil, palm oil, palm kernel oil, kaya oil (from *Torreya nucifera S J Z*) tung oil, kapok oil, kuromoji oil (from *Lindera umbellata*), sasanqua oil (from *Camellia sasanqua*), tea seed oil, perilla oil, cacao butter, Isocacoa MO-5 (registered by KAO-SOAP Co. Ltd. in Japan: Higher saturated fatty acid triglyceride), cinnamon oil (from *Cinnamomum japonicum S.EB.*), laurin fat, beef tallow, lard, wool fat, turtle oil, squalene, etc.; materials obtainable by modifying chemically the oleaginous bases mentioned above with such procedures as hydrogenation, interesterification, acetylation, fractional extraction; mineral oils such as vaseline, paraffin, silicone oil; esters of fatty acids having 6 to 30 carbon atoms with glycerol, such as glyceryl palmitate, glyceryl laurate, glyceryl stearate, glyceryl myristate; waxes such as esters of fatty acids having 6 to 30 carbon atoms with alcohols having 2 to 8 carbon atoms, e.g. isopropyl myristate, butyl stearate, diisopropyl adipate, diethyl sebacate; higher fatty acids of 6 to 30 carbon atoms, e.g. stearic acid, oleic acid. These oleaginous bases may be employed either singly or as a mixture of two or more of them. Particularly preferable oleaginous bases are corn oil, cacao butter, Isocacao MO-5, interesterified fats and oils (e.g. mono-, di- or triglyceride of a higher fatty acids such as palmitic acid or stearic acid), artificial suppository base (e.g. Witepsol (registered by Dynamit Novel Aktiengesellschaft in West Germany: Triglyceride of saturated vegetable fatty acids containing a minor amount of monoglycerides).

The oleaginous base is employed in an amount of about 100 to 200,000 times, more preferably about 2,000 to 80,000 times by weight of the peptide.

According to the present invention, it is more preferable to incorporate a non-ionic surfactant into the oleaginous base. The non-ionic surfactant to be employable in the present preparation may be such one as having HLB value of about 7 to 18, more preferably about 9 to 14 ["HLB" is an abbreviation of "Hydrophile-Lipophile Balance" calculated by W.C. Griffin's equation described in J. Soc. Cosmetic Chemist. Vol. 1, 311 (1949)]. Examples of the non-ionic surfactants are set forth below: Polyoxyethylene (hereinafter abbreviated as "POE") higher alcohol ether, in which the higher alcohol has 8 to 18 carbon atoms and the average number of POE unit (hereinafter abbreviated as $n$) is 5 to 30;

| | HLB | n |
|---|---|---|
| POE cetyl ether; | 8.8 | 7 |
| | 10.6 | 10 |
| | 11.5 | 12 |
| | 12.8 | 15 |
| | 13.6 | 17 |
| | 14.1 | 20 |
| POE oleyl ether; | HLB | n |
| | 8.9 | 8 |
| | 10.0 | 10 |
| | 11.0 | 12 |
| | 11.6 | 15 |
| | 13.6 | 20 |
| | 14.6 | 25 |
| POE stearyl ether; | HLB | n |
| | 8.9 | 8 |
| | 10.6 | 11 |
| | 12.2 | 15 |
| | 13.6 | 20 |
| | 14.5 | 20 |
| POE lauryl ether; | HLB | n |
| | 8.6 | 5 |
| | 10.9 | 8 |
| | 11.5 | 9 |
| | 12.1 | 10 |
| | 13.0 | 12 |
| | 14.1 | 15 |
| | 14.8 | 17 |
| | 15.5 | 20 |
| POE octyl ether; | HLB | n |
| | 13.9 | 10 |
| | 15.8 | 15 |

POE fatty acid ester in which the fatty acid has 12 to 18 carbon atoms and $n$ is 5 to 30;

| | HLB | n |
|---|---|---|
| POE monostearate; | 10.6 | 10 |
| | 13.0 | 13 |
| | 13.9 | 20 |
| | 15.9 | 30 |
| | 15.2 | 25 |
| POE monooleate; | HLB | n |
| | 9.5 | 8 |
| | 10.7 | 10 |
| | 13.6 | 15 |
| POE monolaurate; | HLB | n |
| | 12.6 | 10 |

POE sorbitan fatty acid ester in which the fatty acid has 12 to 18 carbon atoms and $n$ is 4 to 20;

| | HLB | n |
|---|---|---|
| POE sorbitan monooleate; | 10.0 | 5 |
| | 15.0 | 20 |
| POE sorbitan monolaurate; | HLB | n |
| | 13.3 | 4 |
| | 16.7 | 20 |
| POE sorbitan monopalmitate; | HLB | n |
| | 15.6 | 20 |
| POE sorbitan monostearate; | HLB | n |
| | 9.6 | 4 |
| | 14.9 | 20 |

The non-ionic surfactant may be employed in an amount of at least about one hundredth (1/100) by weight of the oleaginous base. The upper limit of the amount of the surfactant to be employed is about one half, more preferably about one tenth by weight of the oleaginous base.

The present preparation is prepared essentially by dispersing the peptide homogeneously in the oleaginous base or in a mixture of the oleaginous base and the non-ionic surfactant.

For instance, the oleaginous base and the non-ionic surfactant are melted together and the peptide is added to the melt. The mixture is melted with heating and mixed to disperse the peptide homogeneously and molded into a suppository or an ointment. In the above process, the addition of peptide may preferably conducted in a state of its solution in a relatively small amount of water.

It is possible to incorporate into the present preparation any other additives such as metallic soaps, waxes, benzoic acid, polyethylene glycol, antioxidants, cellulose derivatives (e.g. ethyl cellulose) or preservatives.

The present preparation is administered by rectal or vaginal route to warm-blooded animals such as rats, domestic fowl, quail, horses, cows, pigs, sheep and human beings to produce effectively the LH-releasing activity, without giving undesirable side effects.

An amount of the peptide to be administered in a single dose is determined clinically dependent upon the type of peptides, host, symptom and severity of the disease to be treated, etc. For inducing or promoting ovulation in animals of normal conditions, dosage of the peptide may be selected suitably from the range of about 1 $\mu$g/kg to 100 $\mu$g/kg of a body weight. For inducing ovulation in dysmenorrheal animals, dose of the peptide may be determined suitably within the range of about 10 $\mu$g/kg to about 200 $\mu$g/kg of a body weight.

The nona-peptides (I) to be employable in the present invention are produced by using suitably such synthetic methods as well known in the peptide chemistry. The nona-peptides (I) are also prepared by the process developed by the present Applicant, Takeda Chemical Industries, Ltd. and such processes are exemplified in the following reaction schemes and Reference.

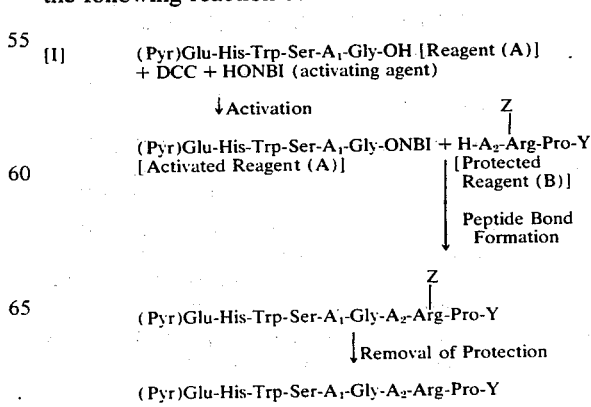

[I]
(Pyr)Glu-His-Trp-Ser-A$_1$-Gly-OH [Reagent (A)]
+ DCC + HONBI (activating agent)

↓ Activation (Pyr)Glu-His-Trp-Ser-A$_1$-Gly-ONBI + H-A$_2$-Arg-Pro-Y
[Activated Reagent (A)]   [Protected Reagent (B)]

↓ Peptide Bond Formation (Pyr)Glu-His-Trp-Ser-A$_1$-Gly-A$_2$-Arg-Pro-Y
           (with Z on Arg)

↓ Removal of Protection (Pyr)Glu-His-Trp-Ser-A$_1$-Gly-A$_2$-Arg-Pro-Y

-continued

[II]

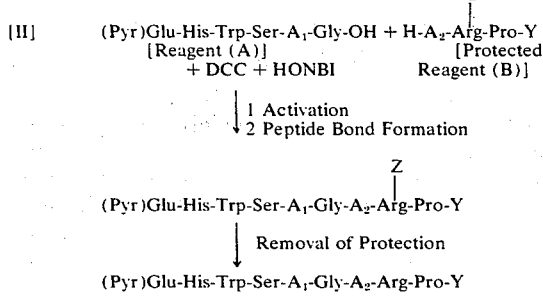

In the above, DCC is N,N'-dicyclohexylcarbodiimide, HONBI is N-hydroxy-5-norbornene-2,3-dicarboximide, Z is a protecting group of the guanidino group of the L-arginine residue, and Y has the meanings as defined before. Those abbreviations have the same meanings as above throughout the present specification.

Reference: Production of (Pyr)Glu-His-Trp-Ser-Tyr-Gly-Leu-Arg-Pro-NHC$_2$H$_5$

It is to be noted that relation between part by weight and part by volume corresponds to that gram and milliliter.

a. Preparation of Z-Arg(NO$_2$)-Pro-NHC$_2$H$_5$

In 10 parts by volume of DMF are dissolved 0.901 part by weight of Z-Arg(NO$_2$)-Pro-OH and 0.181 part by weight of ethylamine hydrochloride and, under cooling at 0°C, 0.38 part by volume of triethylamine is added dropwise. Then, 0.43 part by weight of HONBI and 0.495 part by weight of DCC are added and the mixture is stirred at 0°C for 5 hours and, then, at room temperature for 10 hours. The byproduct urea is filtered off and the DMF is distilled off. The residue is extracted with chloroform, washed with water and dried over anhydrous magnesium sulfate. The chloroform is distilled off and the residue is treated with ether and reprecipitated from methanol-ether. Yield 0.692 part by weight, Rf (chloroform-methanol)-acetic acid = 9:1:0.5) = 0.50; m.p.141°–145°C(decomp.); $[\alpha]_D^{24}$= −44.6° ($c$=1, methanol).

Analysis for C$_{21}$H$_{31}$O$_6$N$_7$; Calcd.: C, 52.82; H, 6.54; N, 20.53; Found: C, 52.95; H, 6.77; N, 19.65.

b. Preparation of Z-Leu-Arg(NO$_2$)-Pro-NHC$_2$H$_5$

In 5 parts by volume of 25% HBr-acetic acid is dissolved 0.572 part by weight of Z-Arg(NO$_2$)-Pro-NHC$_2$H$_5$ and the solution is allowed to stand at room temperature for 30 minutes. Then, dry ether is added to the reaction mixture and the resulting precipitate is recovered by filtration and dried. Meanwhile, 0.291 part by weight of Z-Leu-OH is dissolved in 5 parts by volume of dioxane and, under cooling, 0.247 part by weight of DCC and 0.215 part by weight of HONBI are added. The mixture is stirred for 2hours and the byproduct urea is filtered off. To the filtrate is added the precipitate prepared above, which is dissolved by the addition of 3 parts by volume of DMF. Under cooling, 0.17 part by volume of triethylamine is added dropwise and, then, the mixture is stirred at room temperature overnight. The solvent is distilled off and the residue is extracted with chloroform and washed with water. The chloroform layer is dried over anhydrous magnesium sulfate and the chloroform is distilled off. The residue is treated with ether and reprecipitated from methanol-ether. Yield 0.47 part by weight. (72%); m.p.144°–146°C(decomp.); Rf (chloroform-methanol-acetic acid = 9:1:0.5) = 0.40; $[\alpha]_D^{24}$= −58.0°($c$=1, methanol).

c. In 25% HBr-acetic acid is dissolved 0.165 part by weight of Z-Leu-Arg(NO$_2$)-Pro-NHC$_2$H$_5$ and the solution is allowed to stand at room temperature for 30 minutes. Then, dry ether is added to the reaction mixture and the precipitate formed is recovered by filtration and dried well. This precipitate is dissolved in 3 parts by volume of DMF and under cooling and stirring, 0.05 part by volume of N-ethylmorpholine is added dropwise. In this solution is dissolved 0.19 part by volume of (Pyr)Glu-His-Trp-Ser-Tyr-Gly-OH hydrochloride, followed by the addition of 0.054 part by weight of HONHI and 0.062 part by weight of DCC.

The mixture is stirred at 0°C for 2 hours and, then, at room temperature overnight. The byproduct urea is removed by filtration and the DMF is distilled off. The residue is treated with ethyl acetate to obtain powder weighing 0.32 part by weight. This product is applied to a column of Amberlite XAD-2 and desorbed in a linear gradient elution system of a 5% aqueos ethanol to ethanol. The principal fraction is lyophilized to obtain 0.11 part by volume of pure (Pyr)Glu-His-Trp-Ser-Tyr-Gly-Leu-Arg(NO$_2$)-Pro-NHC$_2$H$_5$. This product is treated with 4 parts by volume of hydrogen fluoride at 0°C for 1 hour in the presence of 0.02 part by volume of anisol and 0.02 part by volume of mercaptoethanol. The hydrogen fluoride is distilled off and, after drying, the residue is dissolved in water. The solution is passed through a column of Amberlite IRA-400(acetate-form) and, then, caused to adsorb on a column of carboxymethylcellulose. The column is eluted in a linear gradient elution system of 0.005N-aqueous ammonium acetate to 0.2N-aqueous ammonium acetate and the principal fraction is lyophilized. The procedure yields 0.087 part by weight of pure (Pyr)Glu-His-Trp-Ser-Tyr-Gly-Leu-Arg-Pro-NHC$_2$H$_5$. Rf (n-butanol-ethyl acetate-acetic acid-water = 1:1:1:1) = 0.36; $[\alpha]_D^{24}$ = −56.2° ($c$=0.5, 5% acetic acid)

Amino acid analysis: His, 0.95(1): Arg, 0.98(1); Ser, 0.95(1); Glu, 0.98(1); Pro, 1.00(1); Gly, 1.00(1); Leu, 1.00(1); Tyr, 1.00(1); NH$_2$C$_2$H$_5$, 1.10(1).

Parenthesized figures denote theoretical values.

It is evident that other nona-peptides (I) can be synthesized after the process substantially similar to the Reference given above.

EXAMPLE 1

Ten grams of higher saturated fatty acid triglyceride (Witepsol) is melted at 45°C and 16 mg. of LH-RH is dispersed in the melt in a mortar. Then, 90 g. of Witepsol is gradually added in the molten state under thorough stirring to obtain a homogeneous mixture. The mixture is filled into suppository containers for rats in an amount of 200 mg. per container and the filled containers are then quenched in ice-water to obtain suppositories. The LH-RH content of each suppository may be modified by varying the proportion of said triglyceride.

EXAMPLE 2

In about 0.5 ml. of water is dissolved 16 mg. of LH-RH and, then, 4 g. of refined lanolin is added. The composition is milled and admixed well in a mortar. Then, 94 g. of higher saturated fatty acid triglyceride (Witepsol) which has been melted at 45°C and 2 g. of polyoxyethylene lauryl ether (HLB = 11.5, $n = 9$) are gradually added and admixed well. The mixture is processed in the same manner as in Example 1 to prepare solid suppositories for rats. The LH-RH content of each suppository may be adjusted by varying the amount of the basis comprising a thorough mixture of 98 g. of said triglyceride and 2 g. of the polyoxyethylene lauryl ether.

EXAMPLE 3

In about 0.5 ml. of water is dissolved 16 mg. of LH-RH and, then, 4 g. of refined lanolin is added. After the composition is milled and admixed well in a mortar, 70 g. of corn oil, 24 g. of higher saturated fatty acid triglyceride (Witepsol) which has been melted at 45°C and 2 g. of polyoxyethylene lauryl ether (HLB = 12.1, $n = 10$) are added, followed by thorough milling. The mixture is dispensed into 1 ml. injection syringes in an amount of 200 mg. per syringe to prepare ointment-type suppositories for rats. The LH-RH content of each suppository may be modified by varying an amount of the basis comprising a thorough mixture of 70 g. of corn oil, 28 g. of said triglyceride and 2 g. of the polyoxyethylene lauryl ether.

EXAMPLE 4

A preparation is obtained by the same procedure as in Example 1 except LH-RH is replaced by the nonapeptide of the formula:

(Pyr)Glu-His-Trp-Ser-Tyr-Gly-Leu-Arg-Pro-NHC$_2$H$_5$

EXAMPLE 5

A preparation is obtained by the same procedure as in Example 2 except LH-RH is replaced by the nonapeptide of the formula:

(Pyr)Glu-His-Trp-Ser-Tyr-Gly-Leu-Arg-Pro-NHCH$_2$CH$_2$OH

EXAMPLE 6

A preparation is obtained by the same procedure as in Example 3 except LH-RH is replaced by the nonapeptide of the formula:

(Pyr)Glu-His-Trp-Ser-Tyr-Gly-Leu-Arg-Pro-Pyrrolidine

TEST ON PHARMACOLOGICAL EFFECT OF THE PRESENT PREPARATIONS TEST METHOD

Adult female rats (SD-strain, 120–150 days old, 250–350 g. of body weight) are administered by rectal or vaginal route with the present preparations when they are in diestrus. The animals were autopsied on the next day after the administration and the Fallopian tubes are examined for the presence or the absence of ova to determine if the ovulation has taken place.

RESULT:

As shown in Table 1, the present preparations cause ovulation effectively by the rectal or vaginal administration.

Table 1

| Dose/rat ($\mu$g.) | Solid suppository*1 | | Solid suppository*2 (Containing 2% of POE lauryl ether) | Ointment-type suppository*3 (Containing 2% of POE lauryl ether) | |
|---|---|---|---|---|---|
| | Rectal | Vaginal | Rectal | Rectal | Vaginal |
| 1 | | | 0 | 0 | 0 |
| 2 | | | 17 | 40 | 0 |
| 4 | | | | 70 | 0 |
| 8 | 0 | | 80 | 80 | 33 |
| 12.5 | | 70 | | | |
| 16 | 10 | | 90 | 89 | |
| 25 | | 86 | | | |
| 32 | 80 | | | | |

*1 The preparation obtained in Example 1
*2 The preparation obtained in Example 2
*3 The preparation obtained in Example 3

Effectiveness (%) = $\dfrac{\text{number of rats with ovulation}}{\text{number of rats tested}} \times 100$

What we claim is:

1. Preparation for rectal or vaginal administration essentially comprising a nona- or deca-peptide, having luteinizing hormone-releasing activity, of the formula: (Pyr)Glu-His-Trp-Ser-A$_1$-Gly-A$_2$-Arg-Pro-Y wherein A$_1$ is Tyr or Phe; A$_2$ is Leu, Nle, Ile or Met; and Y is -NHC$_2$H$_5$, -NH-C$_2$H$_4$OH,

or -Gly-NH$_2$ dispersed homogeneously in an oleaginous base and a non-ionic surfactant which is a polyoxyethylene higher alcohol ether having 8 to 18 carbon atoms.

2. The preparation as claimed in claim 1, wherein the oleaginous base is triglyceride of a higher saturated fatty acid of 6 to 30 carbon atoms.

3. The preparation as claimed in claim 2, wherein the higher saturated fatty acid is palmitic acid, lauric acid, stearic acid or myristic acid.

4. The preparation as claimed in claim 1, wherein the oleaginous base is triglyceride of saturated vegetable fatty acid containing a minor amount of monoglyceride.

5. The preparation as claimed in claim 1, wherein an amount of the oleaginous base is about 100 to 200,000 times by weight of the peptide.

6. The preparation as claimed in claim 1, wherein an amount of the oleaginous base is about 2,000 to 80,000 times by weight of the peptide.

7. The preparation as claimed in claim 1, wherein the peptide is luteinizing hormone-releasing hormone.

8. The preparation as claimed in claim 1, wherein the non-ionic surfactant is polyoxyethylene lauryl ether.

9. The preparation as claimed in claim 1, wherein an amount of the non-ionic surfactant is at least about one hundredth by weight of the oleaginous base.

10. The preparation as claimed in claim 9, wherein an amount of the non-ionic surfactant is not more than about one tenth by weight of the oleaginous base.

11. The preparation as claimed in claim 1, wherein the non-ionic surfactant has an HLB value of about 7 to 18.

12. The preparation as claimed in claim 1; wherein the non-ionic surfactant has an HLB value of about 9 to 14.

* * * * *